Patented Oct. 15, 1946

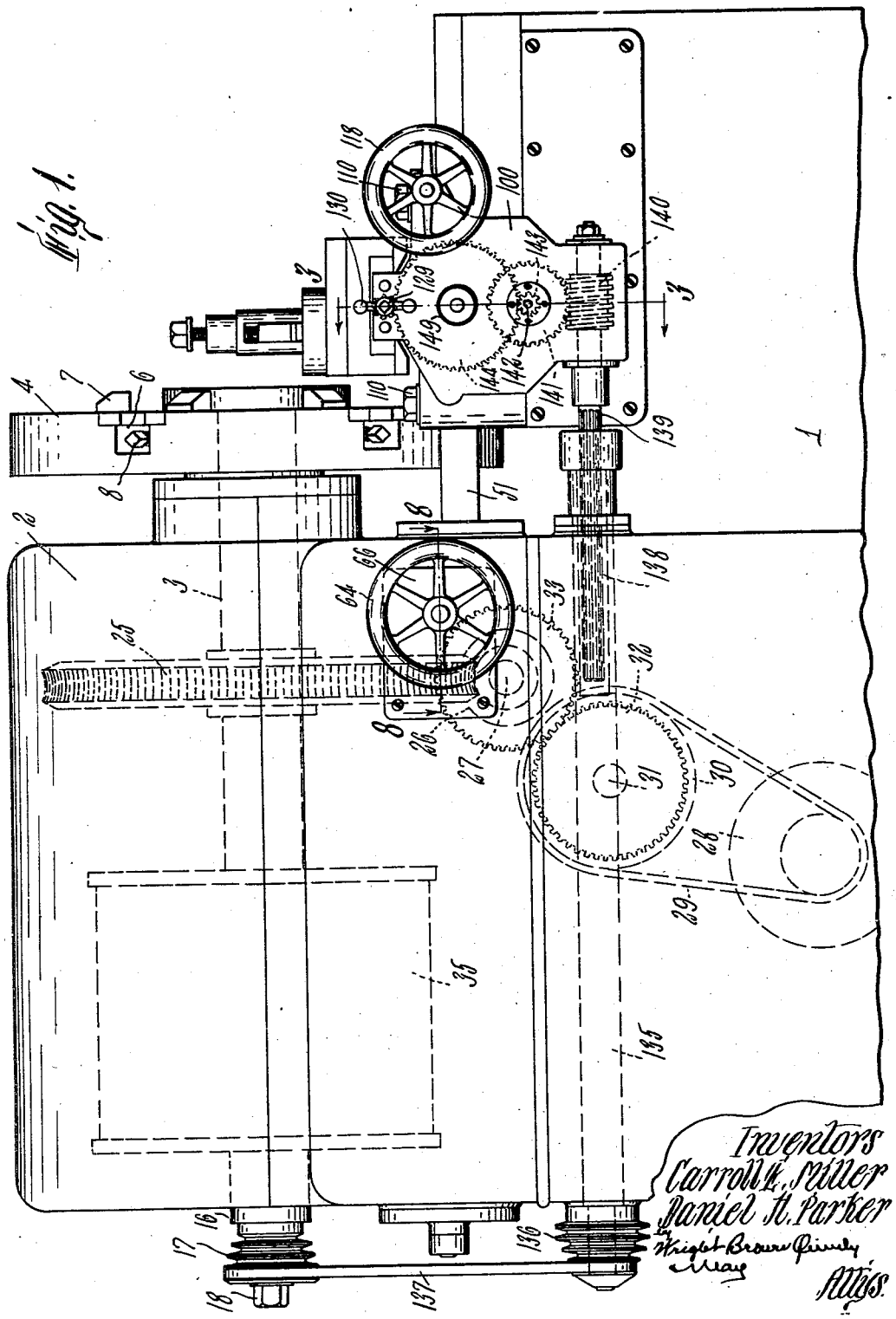

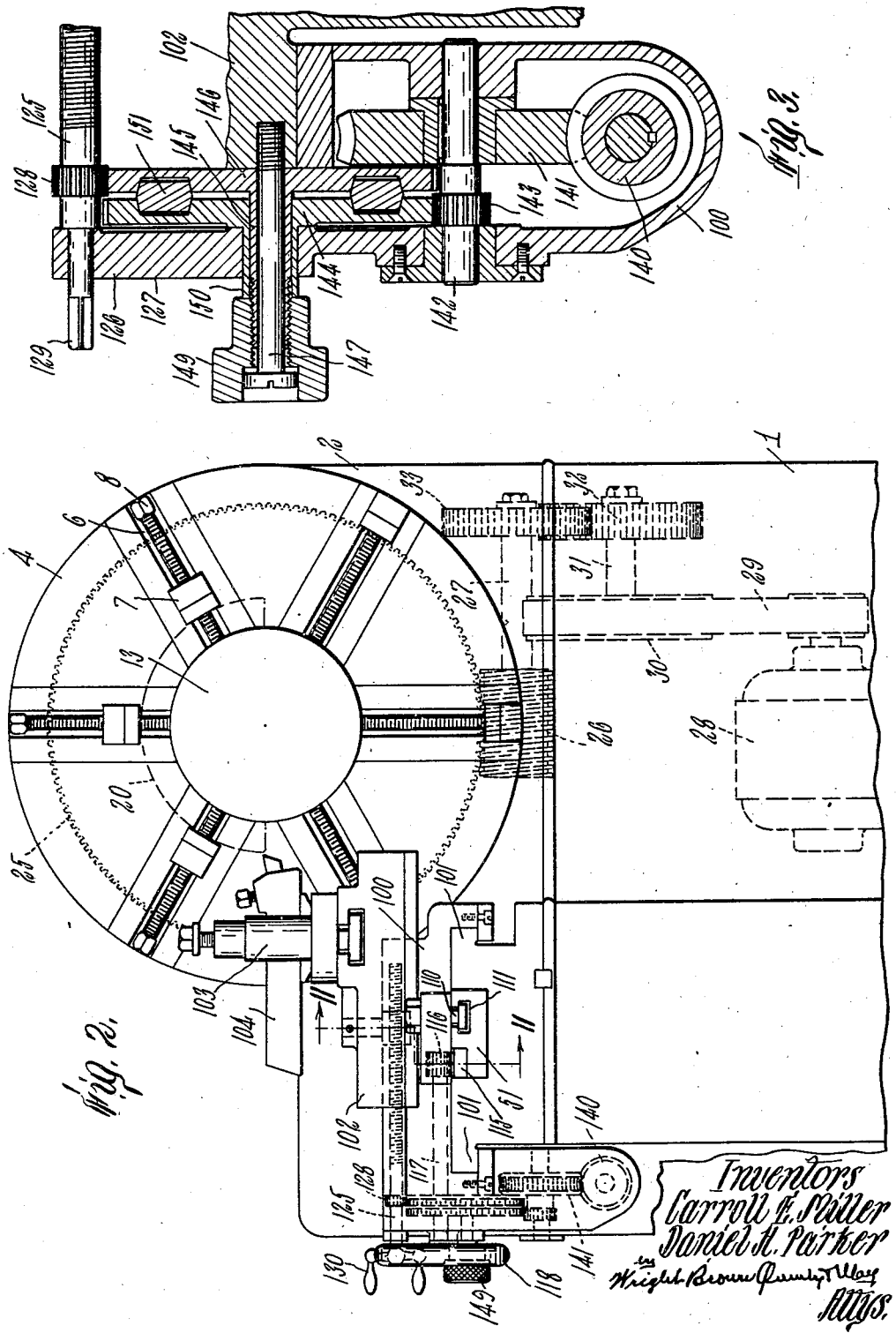

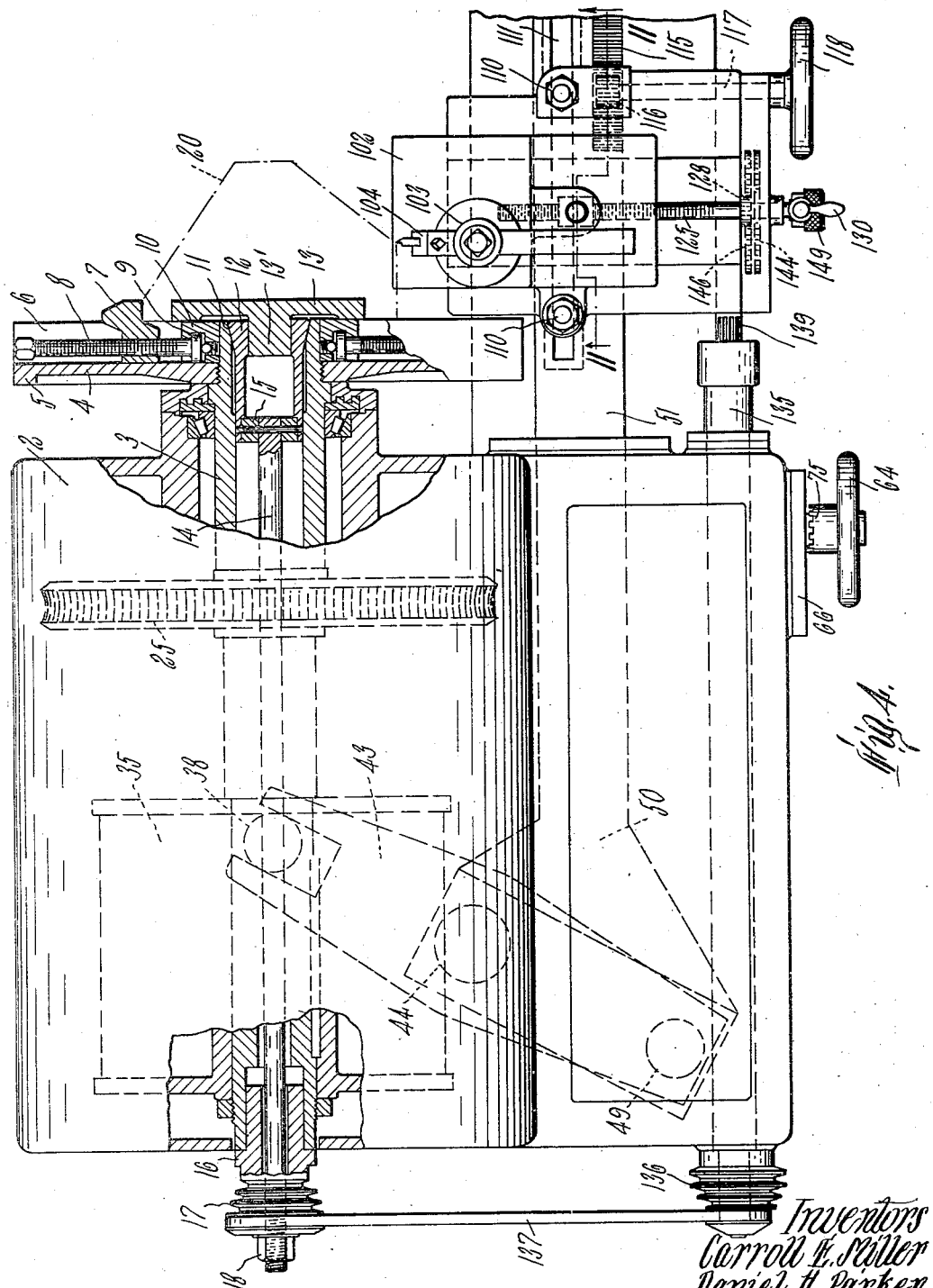

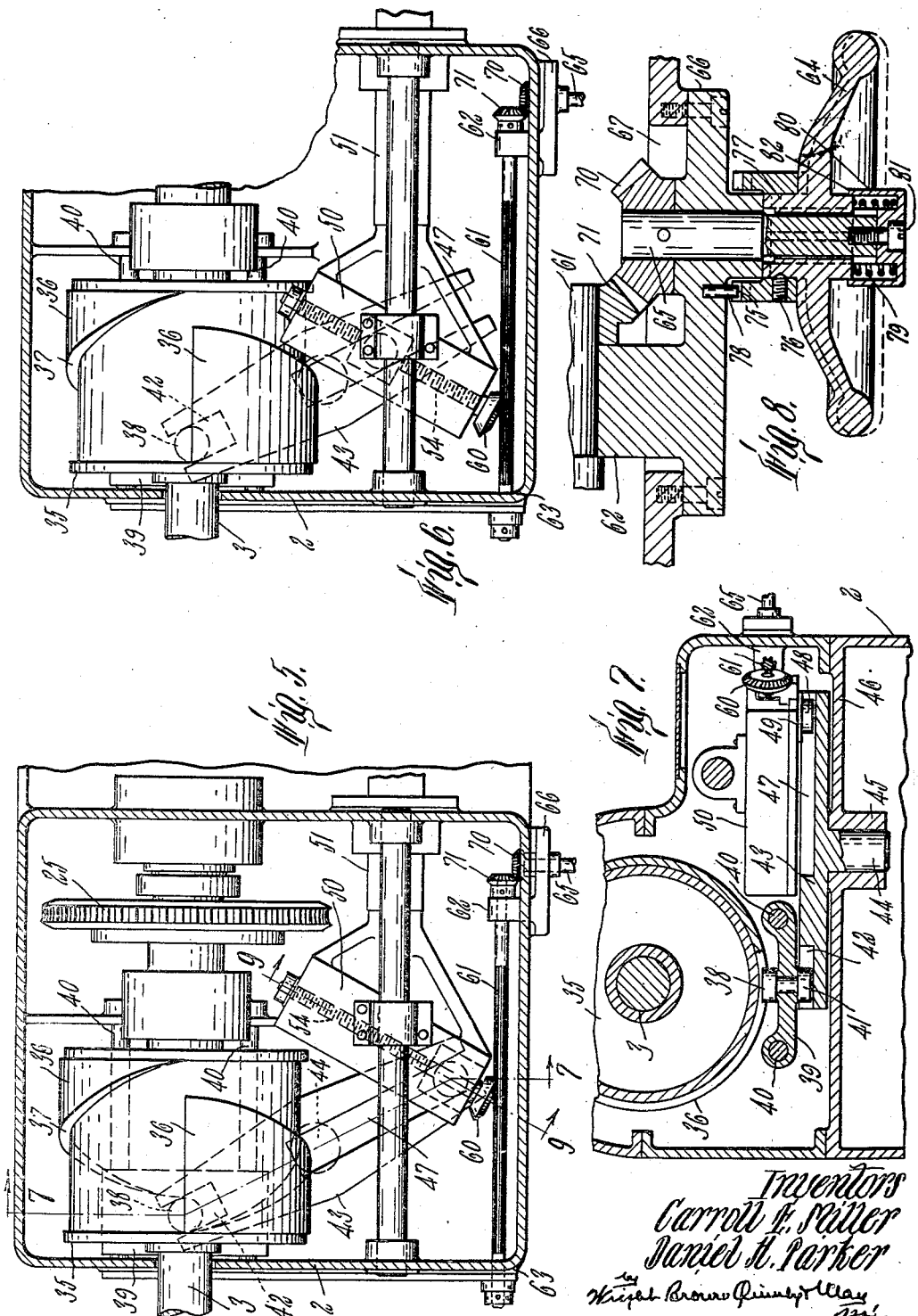

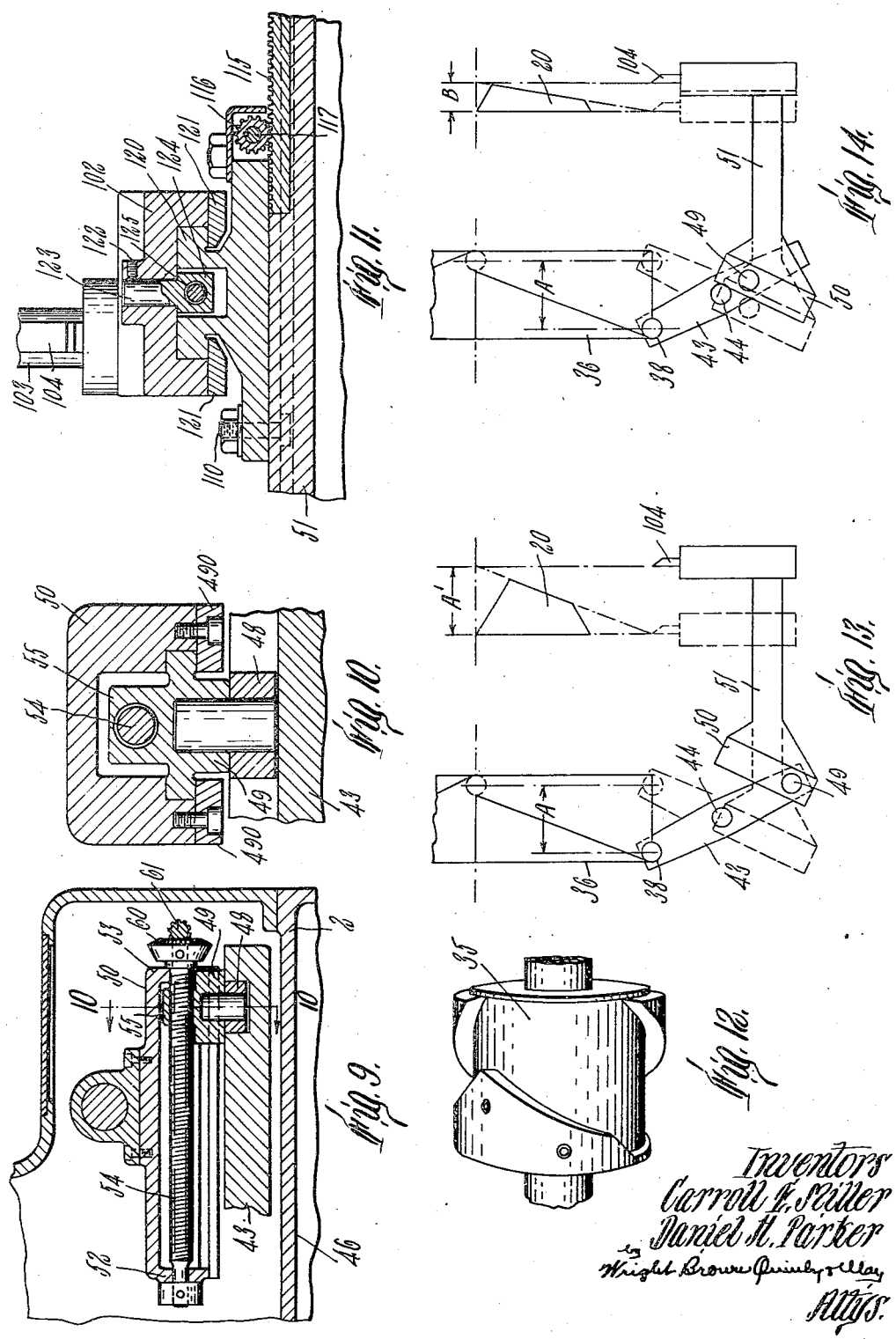

2,409,301

UNITED STATES PATENT OFFICE 2,409,301

CAM CUTTING MACHINE

Carroll E. Miller and Daniel H. Parker, Windsor, Vt., assignors to Cone Automatic Machine Company Inc., Windsor, Vt., a corporation of Vermont Application November 11, 1942, Serial No. 465,226

6 Claims. (Cl. 82—19)

This invention has for an object to produce a machine for cutting cams, more particularly those of the arcuate type adapted to be removably secured to the peripheries of rotary drums. Such cams are commonly employed in machine tools, for example, for determining the cycle of operations of the machine, which in turn, is dependent on the article which it is desired that the machine produce, and the various machining operations employed.

In accordance with this invention means are provided for securing the cam blanks concentrically to a rotary spindle and with the edges which are to be cut outwardly presented, and a tool is moved to properly cut the blanks by cam means providing for adjustment so that a controlling or master cam for the tool may move the tool to cause the desired cam faces to be cut in chosen relation to the master cam and not necessarily to the pitch of such master cam.

For a more complete understanding of this invention, reference may be had to the accompanying drawings in which Figures 1 and 2 are fragmentary front and right hand end elevations, respectively, of a machine embodying the invention.

Figure 3 is a detail sectional view on line 3—3 of Figure 1.

Figure 4 is a fragmentary top plan view of the machine with parts broken away and in section.

Figure 5 is a horizontal section through the gear casing showing the drive for the tool feeding mechanism.

Figure 6 is a view similar to Figure 5, but with the parts in different relative positions.

Figures 7 and 9 are detail sectional views on lines 7—7 and 9—9, respectively, of Figure 5.

Figure 8 is a detail sectional view on line 8—8 of Figure 1.

Figure 10 is a detail sectional view on line 10—10 of Figure 9.

Figure 11 is a detail sectional view on line 11—11 of Figures 2 and 4.

Figure 12 is a perspective view of the master cam.

Figures 13 and 14 are diagrammatic views illustrating the effects of adjustment in changing the angle of cam cut as produced by the master cam.

Referring to the accompanying drawings, at 1 is indicated the bed of the machine, which has toward one end, an upstanding portion 2 in which is journaled a work spindle 3. The forward end of this work spindle extends outwardly from the portion 2 and has attached thereto a cam blank receiving chuck 4. As shown best in Figures 2 and 4, this chuck comprises a disk portion 5 having radially arranged ways 6 in its forward face for the reception of work clamping jaws 7 arranged to be moved radially in and out by screws 8 threaded therethrough and journaled as at 9 in a hub portion 10 of the chuck. As shown the forward end of the spindle 3, which is hollow, has an internal outwardly beveled face 11 with which coacts a mating face of a collet 12. This collet 12 is arranged to grip the shank 13' of an arbor 13, the forward face of which overlies the outer face of the hub 10 and supports the inner face of the cam blank 20, the outer face of which is engaged by the jaws 7. The retraction of the sleeve 12 will wedge the split ends of the collet 12 inwardly and securely hold the shank 13'. The portion 4 is shown as threaded onto a threaded portion of the spindle. Gripping of the arbor by the collet 12 may be produced by pulling rearwardly on a draw rod 14 which extends through the spindle 3 and is secured at its forward end through a collar 15 to the collet 12. This rod 14 extends through a cap sleeve 16 at the rear end of the spindle 3, which sleeve is provided with a cone pulley 17 and the rear end of the rod 14 is shown as threaded for the reception of a nut 18 which may bear against the outer end of the cap sleeve 16, so that by tightening this nut 18 the rod 14 and the collet 12 may be moved in clamping direction. This clamping also secures the cone pulley to the spindle, failure to properly clamp the mandrel permitting the pulley to slip. As will later appear, this pulley drives the tool feed, which will not function unless the collet is closed tight against the mandrel 13.

Within the frame portion 2 the spindle 3 has fixed thereto a worm wheel 25 with which meshes a worm 26 fixed to a shaft 27. This shaft 27 is rotated as by a suitable motor 28 supported within the base 1 and which has its driving pulley connected as by a belt 29 to a pulley 30 carried by a shaft 31. This shaft 31 carries a gear 32 which meshes with a gear 33 fixed to the shaft 27. By this means the spindle 3 to which the cam blank is attached is rotated. The spindle 3 also has fixed thereto a cam drum 35 to which may be fixed a master cam 36 (see Figures 5 and 6) having an active cam face 37. As the cam drum 35 revolves, this master cam acts upon a follower roll 38 carried by a slide 39 (see Figure 7) mounted for rectilinear motion on a pair of guide bars 40. This cam follower 38 has a roller 41 which rides within a guide slot 42 in one end of a lever 43. As shown best in Figure 7, this lever 43 has an integral fulcrum member 44 journaled in a bearing 45 of a horizontal wall portion 46 of the bed 2. This lever 43 also has a longitudinal guide slot 47 within which rides a roller 48 projecting downwardly from a slide 49. This slide 49 is guided for longitudinal motion in a way in which it is retained by gibs 49a in the head 50 of an axially movable bar 51 arranged parallel to the spindle 3. The head 50 is arranged at an angle to the perpendicular to the axis of the bar 51 and has journaled between end wall members 52 and 53, a threaded shaft 54. The block 49 has an upward extension 55 having threaded engagement with the shaft 54 so that by rotation of the shaft 54 the block 49 may be moved lengthwise of the head 50, thus to adjust the position of the block 49 with its follower member 48 forwardly or backwardly with relation to the machine and therefore toward and from the fulcrum 44 of the lever 43. This adjusts the extent of axial motion of the bar 51 as the lever 43 is rocked by the engagement of the follower 38 on the cam surface 37 of the master cam and, as will appear, controls one motion of the cam cutting tool. This adjustment of the block 49 by rotation of the threaded shaft 54 is produced by rotation of a beveled gear 60 secured to the forward end of the shaft 54, which meshes with the teeth of a pinion shaft 61 journaled in bearings 62 and 63, and arranged within the portion 2 parallel to the bar 51 and the spindle 3. The arrangement of the shaft 54 at an angle to the perpendicular to the pinion shaft 61 permits this simple driving connection between them. This adjustment may be effected by hand through rotation of a hand wheel 64 slidably keyed to a stub shaft 65 journaled in a cap 66 adapted to close an opening 67 in the forward wall of the portion 2 and carrying the bearing 62. This inner end of the shaft 65 is provided with a bevel pinion 70 which meshes with a bevel pinion 71 secured to the end portion of the pinion shaft 61. In order to hold the hand wheel 64 in adjusted position so as to prevent accidental adjustment, the hand wheel 64 is yieldably pressed inwardly to bring the serrated inner edge of a sleeve 75, fixed as by a set screw 76 to the hub 77 of the hand wheel, into engagement with a locking pin 78 projecting from the forward face of the cap 66. This is done by a coil spring 79 interposed between the outer end of the hub 77 of the hand wheel, and a cap 80 secured to the outer end of the shaft 65 as by a screw 81, this cap having an integral protecting sleeve 82 housing the spring 79 and slidable over the outer face of the projecting hub 77. By pulling outwardly on the hand wheel, it is released for rotation to adjust the amount of tool travel relative to the lead of the master cam.

The bed 1 projects laterally from the portion 2 and carries suitable tool mechanism for machining the cam blank held by the chuck. As shown this mechanism includes a traversing slide 100 mounted for motion parallel to the spindle 3 on suitable ways 101, and this slide carries on suitable ways, a cross or tool slide 102 supporting a tool holder 103 of conventional type to which may be secured a turning tool 104. This traversing slide 100 is moved parallel to the work spindle through the axial motion of the bar 51 to which it is arranged to be clamped, as by bolts 110 extending through a slot 111 in the bar 51. It will be noted that by adjustment of the position of the follower block 49 forwardly and rearwardly, the amount of motion of the traversing or main slide may be adjusted with respect to the throw of the master cam since this changes the effective lever arm of the lever 43 which is rocked by rotation of the master cam. Thus the slope of the cam cut by the machine may be adjusted relative to that of the master cam. This is shown, for example, in Figures 13 and 14 in which the master cam is shown diagrammatically, giving the throw A to the rear end of the lever 43, the block 49 being positioned toward the forward end of the lever 43. This corresponding motion of the tool is then represented by the distance A'. In Figure 14 the block 49 is shown as adjusted rearwardly, decreasing the throw of the bar 51 so that the motion of the tool is then represented by the distance B for the same throw A of the master cam.

The cross slide 102 which carries the tool 104 is moved to feed the tool in and out with reference to the work and its motion may be controlled automatically so as to produce a desired rate of feed, or its feed may be controlled manually, if desired.

For ease in positioning the tool to provide for different depths of cam to be worked upon, the traversing slide may be provided with means for adjusting it quickly along the bar 51, the bolts 110 being loosened for this purpose. As shown, the bar 51 may have secured thereto at a suitable position therealong, a rack bar 115 with which may mesh a pinion 116 carried by a shaft 117 journaled in the main slide 100 and carrying a hand wheel 118 at its outer end by which the pinion 116 may be turned, thus to adjust the traversing slide along its actuating bar 51.

The cross slide 102 which is mounted on a supporting way 120 of the main slide, and, as shown in Figure 11, is provided with retaining plates 121 projecting beneath the way 120, has secured therein, as by a set screw 122, the shank portion 123 of an internally threaded head 124 through which extends a threaded feed shaft 125. This feed shaft extends through the forward wall 126 of a casing 127 secured to the forward face of the cross slide 102, and is provided inwardly of this wall member with a pinion 128. The forward end of the feed shaft 125 may be squared at 129 for the reception of a handle 130 (see Figure 1) having a squared opening to engage over the portion 129, so that if desired the feed shaft may be turned by hand.

The means for rotating the feed shaft 125 automatically, comprises a shaft 135 journaled in the bed of the machine, and having at its rear end a cone pulley 136 connected through a belt 137 to the cone pulley 17 on the rear end of the work spindle. This shaft 135 has a hollow splined portion 138 at its inner end for the slidable reception of the externally splined shaft 139 which is journaled in the main carriage 100 where it carries a worm 140. This worm meshes with a worm wheel 141 keyed to a stub shaft 142 and this stub shaft carries a pinion 143 which meshes with a gear 144 journaled on the hub 145 of a gear 146 which meshes with the pinion 128 of the feed shaft. The gear 146 is journaled on a bolt 147, the inner end of which is threaded into the cross slide 102. The hub 145 of the gear 146 projects forwardly of the wall member 127 and is threaded for the reception of a clamping nut 149, which may be clamped against the outer end of the hub 150 of the gear 144, thus to couple the two gears 145 and 146 for simultaneous operation through a friction ring 151 seated in confronting annular recesses in the gears 145 and 146, or to permit them to be loosed from each other and the friction ring, whereupon the feed shaft 125 is free to be turned by hand. This arrangement also permits feed when setting up and retraction of the tool slide by hand when desired, it being only necessary to release the clamping nut 149 so that this may be done by rotating the handle 130. The machine is started and stopped by control of the motor 28 which may conveniently be done by the use of push button switches as is well known in the art.

From the foregoing description of an embodiment of this invention, it should be evident to those skilled in the art that various changes and modifications might be made without departing from the spirit or scope of this invention.

We claim:

1. A cam cutting machine comprising a bed, a work spindle journaled in said bed, a cam blank holding chuck secured to said spindle, a carriage movable on said bed substantially parallel to the axis of said spindle, a cross slide movable on said carriage, a cam cutting tool carried by said cross slide, a master cam coupled for rotation with said spindle, a lever, a cam follower in operative relation to said master cam and operatively connected to said lever, said lever having a guide portion extending outwardly from its fulcrum, a member adjustable along said guide portion, an arm connected to said carriage and provided with a transversely extending head, a threaded shaft journaled in said head, a nut on said shaft carrying said member, and means for rotating said shaft to adjust said member relative to the fulcrum of said lever.

2. A cam cutting machine comprising a bed, a work spindle journaled in said bed, a cam blank holding chuck secured to said spindle, a carriage movable on said bed substantially parallel to the axis of said spindle, a cross slide movable on said carriage, a cam cutting tool carried by said cross slide, a master cam coupled for rotation with said spindle, a lever, a cam follower in operative relation to said master cam and operatively connected to said lever, said lever having a guide portion extending outwardly from its fulcrum, a member adjustable along said guide portion, an arm connected to said carriage and provided with a transversely extending head, a threaded shaft journaled in said head, a nut on said shaft carrying said member, a gear on the outer end of said shaft, and means for rotating said gear.

3. A cam cutting machine comprising a bed, a work spindle journaled in said bed, a cam blank holding chuck secured to said spindle, a carriage movable on said bed substantially parallel to the axis of said spindle, a cross slide movable on said carriage, a cam cutting tool carried by said cross slide, a master cam coupled for rotation with said spindle, a lever, a cam follower in operative relation to said master cam and operatively connected to said lever, said lever having a guide portion extending outwardly from its fulcrum, a member adjustable along said guide portion, an arm connected to said carriage and provided with a transversely extending head, a threaded shaft journaled in said head arranged at an angle to the perpendicular to said spindle, a bevel gear secured to the outer end of said shaft, a pinion shaft arranged substantially parallel to said spindle and meshing with said bevel gear, a nut on said threaded shaft carrying said member, and means for rotating said pinion shaft to adjust said member along said threaded shaft.

4. A machine of the class described, comprising a hollow work spindle, a chuck carried by one end of said spindle and having work engaging jaws movable toward and from the axis of said spindle, a work supporting arbor having a peripheral portion against which work may be clamped by said jaws and a hub portion extending into said spindle, a collet movable axially within said spindle for gripping said hub portion, a draw rod for actuating said collet, a tool carrier movable lengthwise of said spindle and carrying a tool for operating on a work piece held by said arbor and jaws, means for moving said tool carrier, an actuating member for said moving means carried by said spindle, connections from said draw rod to said actuating member causing the tightening of said collet on said hub portion to operatively connect said actuating member and spindle and release of said collet to release said actuating member from said spindle, and means for rotating said spindle.

5. A machine of the class described, comprising a work spindle, an arbor supported by and movable relative to said work spindle, a tool carrier movable relative to said spindle and supporting a tool for operating on work carried by said arbor, means for moving said carrier, an actuator for said moving means having a driving part releasably connected to said spindle, means for rotating said spindle, and means for simultaneously clamping or releasing said arbor and releasable part relative to said spindle.

6. A machine of the class described, comprising a hollow work spindle, an arbor supported by said work spindle, a tool carrier movable relative to said spindle and supporting a tool for operation on work carried by said arbor, means for moving said carrier, said arbor having a hub portion extending into said spindle at one end, a collet within said spindle for gripping said hub portion, a driving pulley carried at the opposite end of said spindle and operatively connected to said moving means, a draw rod fixed to said collet and extending through said pulley, means for rotating said spindle, and means reacting between said draw rod and pulley for simultaneously actuating said collet to clamp or release said hub portion and to clamp or release said pulley for rotation or slip with relation to said spindle.

CARROLL E. MILLER.
DANIEL H. PARKER.